United States Patent [19]
Troeger

[11] 3,825,992
[45] July 30, 1974

[54] METHOD OF MAKING AN ECCENTRIC FLEXURAL PIVOT

[75] Inventor: Henry Troeger, Cooperstown, N.Y.

[73] Assignee: The Bendix Corporation, Teterboro, N.J.

[22] Filed: Sept. 8, 1972

[21] Appl. No.: 287,298

[52] U.S. Cl............... 29/436, 29/416, 267/160, 308/2 A
[51] Int. Cl............................................. B23p 11/00
[58] Field of Search....... 29/416, 412, 436, 149.5 R, 29/149.5 C; 267/160; 308/2 A

[56] References Cited
UNITED STATES PATENTS
| | | | |
|---|---|---|---|
| 2,931,092 | 4/1960 | Humphrey | 29/416 |
| 3,073,584 | 1/1963 | Troeger | 267/160 |
| 3,319,951 | 5/1967 | Seelig | 267/160 |
| 3,479,107 | 11/1969 | Blythe et al. | 267/160 |

Primary Examiner—Charles W. Lanham
Assistant Examiner—D. C. Crane
Attorney, Agent, or Firm—Anthony F. Cuoco; S. H. Hartz

[57] ABSTRACT

The method of manufacturing a flexural pivot device comprising the sequential steps of forming a cylindrical housing, milling (such as by electrochemical or electrical discharge means) two diagonally-opposite arcuate annular spaces eccentric to the axis of the housing at each end of the housing thereby forming diametrically opposed and overlapping inwardly-projecting eccentric arcuate structure, forming a plurality of resilient members, assembling the resilient members within the housing and securing the resilient members thereto, and cutting a circumferential groove in the housing coincident with the overlapping arcuate structure so that limited relative rotation of one arcuate structure relative to the other may occur upon flexing of the resilient means.

9 Claims, 4 Drawing Figures

METHOD OF MAKING AN ECCENTRIC FLEXURAL PIVOT

FIELD OF THE INVENTION

This invention relates to devices for supporting a mechanism which is to be limitedly rotated about an axis and more particularly concerns improvements in flexural pivot devices which provide limited relative rotation between two parts by flexing crossed flat springs connecting the two parts.

CROSS REFERENCE TO RELATED CASES

This patent application is related to my commonly assigned co-pending patent application U.S. Ser. No. 287,299, filed September 8, 1972.

DESCRIPTION OF THE PRIOR ART

Prior art flexural pivot devices such as those disclosed in my commonly assigned U.S. Pat. No. 3,181,851 disclosed a pivot which was more economical to produce than its predecessor designs. In particular, this patent disclosed a pivot comprised of a pair of flat crossed springs assembled to two pair of arcuate quadrant elements, two of which were slotted and alternately disposed, bonded as a unit and then with the outer sleeve means cut to form a flexural pivot. Although the basic resilient "core" design was unique, it required four quadrant members which had to be stamped and accurately coined, the springs and quadrants had to be assembled and unitized such as by bonding, two diametrically opposed "reliefs" had to be ground on the O.D. of the core, an outer sleeve had to be mounted to the core assembly and then this assembly had to be unitized, a circumferential groove had to be cut therein and the two ends had to be cut and discarded. Thus, this pivot design required essentially five parts and fifteen individual and batch operations.

A subsequent flexural pivot device disclosed in the commonly assigned U.S. Pat. No. 3,319,951 issued in the name of Frederick A. Seelig, eliminated the steps of under-cutting the O.D. of the core and the step of cutting the ends of both core and support structure, however, this device still required the basic core and the problems associated therewith as was mentioned above. Also, the support structure called for in this patent was relatively expensive to form.

My commonly assigned co-pending patent application Ser. No. 286,367 disclosed a method of making a flexural pivot having few parts and greatly reducing the number of operations to be performed in constructing the device. However, the particular electrode design disclosed therein was expensive to fabricate and did not resolve in uniform electrical machining since fresh electrolytic or dielectric fluid could not easily be introduced between the electrode and sleeve because the electrode could not be rotated during the machining operation.

SUMMARY OF THE INVENTION

In the preferred embodiment according to my invention, the method of making a flexural pivot comprises the steps of forming a cylindrical housing having a plurality of diametrically-opposed axially-extending slots therein, removing metal in said housing to form arcuate annular chambers eccentric to the axis of the housing and diametrically opposed at each end thereof by electrical discharge means, stamping a plurality of substantially I-shaped and D-shaped flat spring elements, assembling the spring elements and inserting them in the slots of the housing, and cutting the housing circumferentially to intersect said diagonally-opposite arcuate chambers thereby providing two cylindrical members having axially-extending arcuate structure interconnected by resilient springs such that one cylindrical member may be limitedly rotated relative to the other cylindrical member by flexing said spring members.

It is, therefore, a primary object of this invention to provide a method of making a flexural pivot which requires fewer parts, fewer manufacturing operations, less material and results in stronger pivots than previous means of manufacture.

Another object of the present invention is to provide an improved method for making a flexural pivot device which is simply constructed and can be made in small sizes and which retains the advantages of no backlash and no friction or wear, and has none of the disadvantages associated with devices requiring lubrication at high temperature.

Still another object is to provide a simplified method for more economically manufacturing flexural pivot devices wherein the freedom of motion spaces and travel gaps which take form of eccentric diagonally-opposite arcuate annular spaces are formed by an electrode conforming to the shape of said annular spaces and electrochemical or electrical discharge machine operation. The eccentric disposition of the arcuate structure permits the pivot to also be manufactured by a hollow mill. Such an electrode design permits the use of simple tubular electrodes which are more economical to make, can be easily fabricated from a variety of materials suitable for electrodes, and can be rotated so that fresh electrolytic or dielectric fluid will be introduced between the electrode and the sleeve thus washing out the debris resulting from electrical milling. Thus, uniform electrical machining and low electrode wear result.

The invention further lies in the particular organization of the various elements and their cooperative association with one another to produce the beneficial results intended. The foregoing objects and advantages of the invention will appear more fully hereafter from the consideration of the description which follows, taken together with the accompanying drawings wherein the preferred embodiment of the invention is illustrated. It is to be expressly understood, however, that the drawings are for the purpose of illustration and description and not to be construed as defining the limits of the invention.

DETAILED DESCRIPTION OF THE DRAWINGS

Figure 1:
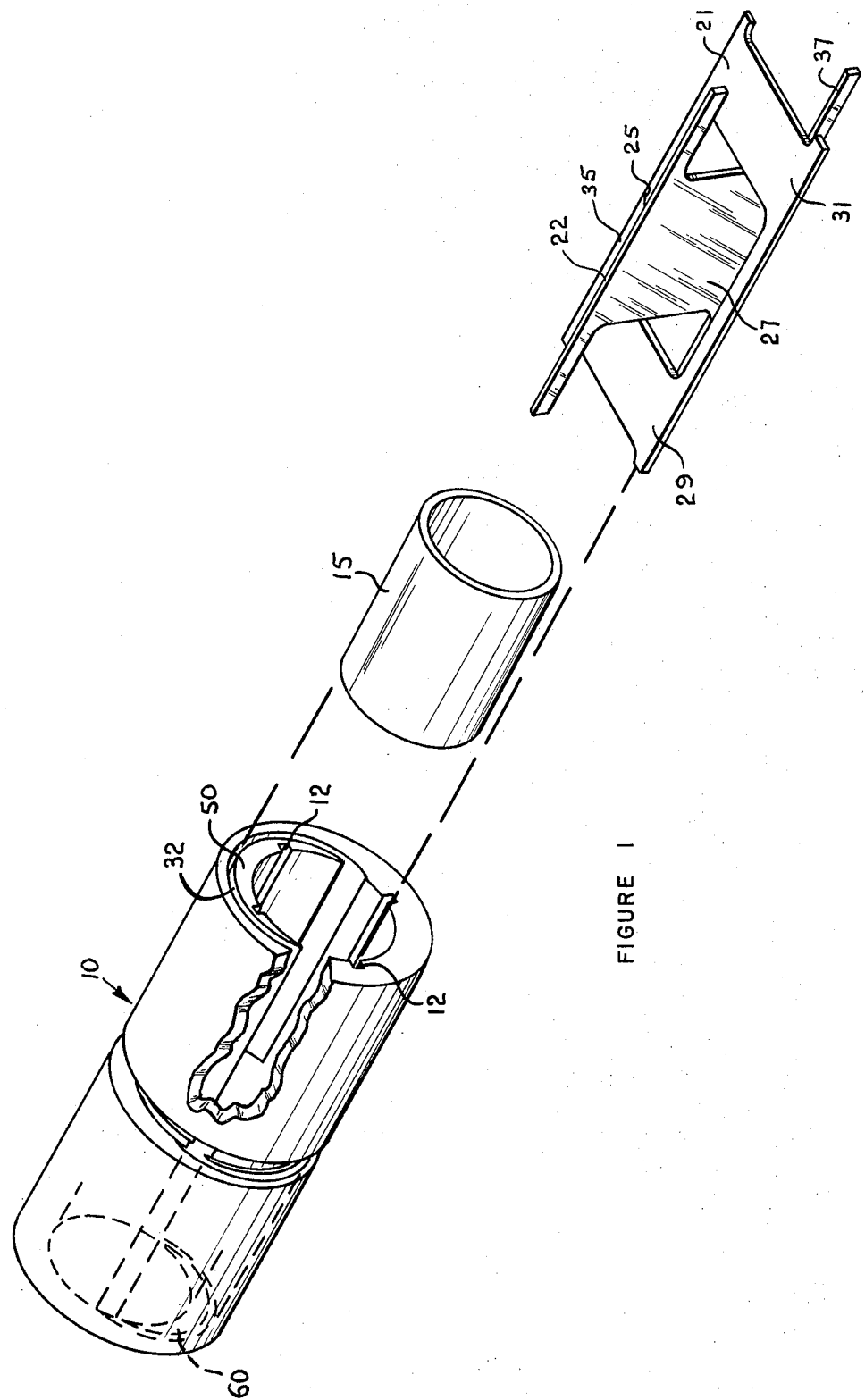
FIG. 1 is an exploded perspective view illustrating from left to right a broken-away view of the pivot housing after forming the eccentric arcuate structure, a view of a typical electrode that can be utilized in forming the eccentric arcuate structure and the subassembly of the flat crossed springs.

Referring to FIG. 1, the main housing 10 of my pivot is shown as a cylindrical member having four diametrically opposed slots 12 therein. Housing 10 can be cast or formed from common bar stock and the slots 12 can be formed by broaching, milling or other conventional means. Two flat springs 21 and 22 are stamped or chemical milled from resilient stock and are assembled as shown. I-shaped spring 22 is slipped through insertion opening 25 in the square-D-shaped spring 21 and the cross element 27 is arranged perpendicular to cross bars 29 and 31 of the square-D-shaped spring 21. Spring 21 has between its cross bars 29 and 31 an axially-extending projection 35. I-shaped spring 22 also has projections 37. It is to be noted that the crossed bars 29 and 31 and cross element 27 merge on a radius to the various projections whereby the cross spring elements are better supported and more durable under flexing when bonded to the housing as will be described. It is apparent that two generally I-shaped springs can be used provided the effective width is about equal, as with the total width of the two bars 29 and 31 relative to the cross element 27. The various projections, of course, have the same thickness as the cross members since the springs are made from metal sheet. Although only one type of flexural arrangement is shown, it should be noted that a myriad of alternate designs could also be used with departing from my invention. For example, a plurality of flat, rectangular flexures or the like as disclosed in my commonly assigned U.S. Pat. No. 3,073,584 could also be successfully employed.

Housing 10 is placed in a machine capable of removing metal by electrochemical or electrical discharge means. Cylindrical electrodes 15, having an O.D. less than the O.D. of housing 10, and an I.D. greater than the I.D. of housing 10 (although this latter condition is not a prerequisite), are advanced into housing 10 on an axis parallel to the axis of housing 10 and displaced from the axis of housing 10 at a distance less than that which would allow the electrode to break through the external surface of housing 10. This process is performed at diametrically opposed ends of housing 10 at an axial depth sufficient to form overlapping arcuate structures 50 and 60 displaced 180° from each other. The arcuate structures thus formed are eccentric to the axis of housing 10 having equally spaced axially-extending edges and being radially spaced from housing 10 at each end thereof.

The subassembly comprised of the resilient members 21 and 22 and/or the sleeve or housing 10 are plated with metals capable of forming a brazed attachment of flexures to the housing 10. The subassembly is then inserted into housing 10 with the projections 37 and 35 of the resilient members mating with the slots 12 of the housing. The assembly of the flexures in the housing can easily be accomplished with automated equipment. The assembly of housing and flexures are then brazed together, preferably by heating in a controlled nonoxidizing atmosphere at a temperature suitable for providing both brazing and proper heat treatment for best flexure properties. Other means of attaching the flexures to the sleeve such as by bonding or welding may also be used, although these means usually require the use of holding fixtures and the like.

Figure 4:
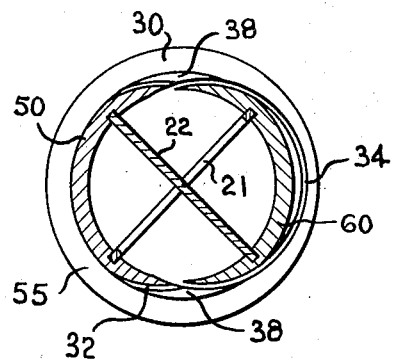
FIG. 4 is a transverse cross-sectional view of my pivot taken along the section lines 4—4 of FIG. 2.
Figure 2:
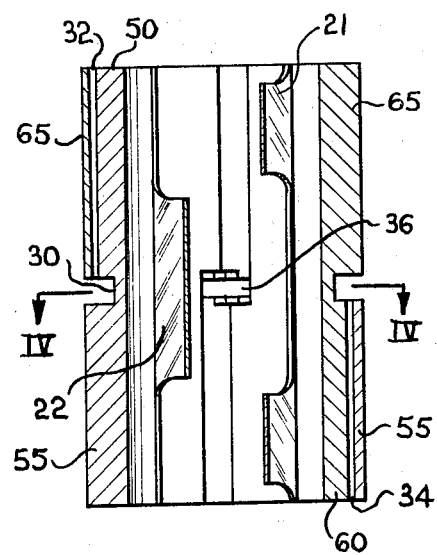
FIG. 2 is a longitudinal cross section of a pivot according to my invention taken along the section 2—2 of FIG. 3.

Referring to FIG. 2, a circumferential groove 30 is cut into housing 10 as by grinding or other conventional means so that it extends into or below the annular arcuate spaces 32 and 34 formed by the electrodes 15. Two slots 36 (only one shown) are cut, as by broaching or grinding during the same operation immediately above, in housing 10 so as to extend below and therefore sever the inner cusps 38 formed by the inner surface of groove 30 and the outer surfaces of the annular arcuate spaces 32 and 34 shown in FIG. 4. These operations result in separating the sleeve or housing 10 into two cylindrical members 55 and 65 having inwardly projecting arcuate structures 50 and 60, respectively, joined only by the flexures 21 and 22 which maintain axial coincidence of the housing portions 55 and 65 but because of the flexure's ability to bend the housing portions 55 and 65 may be rotated with respect to each other through some angle limited by bending stresses in the flexures. Although the flexures of the preferred embodiment of a pivot made according to my invention are shown substantially perpendicular to each other, one skilled in the art will appreciate that in some cases an unequal angular spacing of the flexures may be desirable.

It should be noted that the objects and advantages of my invention are accomplished and in particular that the cylindrical annular spaces 32 and 34 may be formed with a hollow mill or by the electrochemical or electrical discharge machining as was described. The cylindrical form permits the use of simple tubular electrodes 15 which are economical to make, can be fabricated from a variety of materials suitable for electrodes, for example graphite, and can be rotated so that fresh electrolytic or dielectric fluid will be introduced between the electrode and housing thus washing out the debris resulting from the electrical machining. Obviously, this last condition is very important for uniform electrical machining and low electrode wear.

Figure 3:
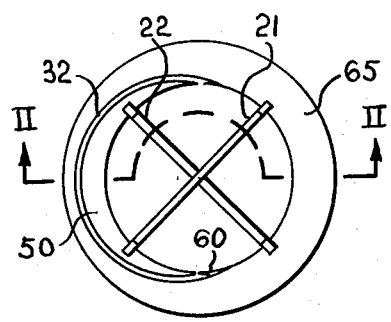
FIG. 3 is an end view of the pivot shown in FIG. 2.

The operation of the flexural pivot device shown in FIG. 2 as a pivotal mounting is believed to be apparent from the foregoing description. The radial spacing between the axially-extending eccentric arcuate strucures 50 and 60, one end illustrated in FIG. 3, provide clearance upon the flexing or bending of the springs 21 and 22. Rotation can be made in either direction as limited by the resistance of the flexures toward radial or axial forces. It is to be noted that the present easily-replaceable flexural pivot is made from only three parts, a cylindrical housing and two flat crossed springs, which are connected by a single bonding step and is more compact for a given capacity then constructions which have springs connected by screws to nontubular mounting means, etc.

It is also to be understood that changes can be made in the disclosed embodiment and methods by persons skilled in the art without departing from the scope of the invention as set forth in the appended claims.

I claim:

1. The method of manufacturing an eccentric flexural pivot comprised of:
   providing a housing having resilient receiving means therein;
   removing material from the housing to form axially overlapping diagonally-opposite arcuate annular spaces eccentric to the axis of the housing;
   forming resilient means to be received within the resilient receiving means of said housing;
   assembling said resilient means within said resilient receiving means; and parting said housing circumferentially to intersect said eccentric arcuate annular spaces.

2. The method according to claim 1 wherein the arcuate annular spaces are formed in said housing by inserting a cylindrical electrode into said housing eccentric to the axis of the housing at diametrically opposite ends of said housing until the arcuate spaces overlap.

3. The method according to claim 1 wherein the housing is parted by cutting a circumferential groove therein so that said groove intersects said annular spaces.

4. The method of manufacturing a flexural pivot as claimed in claim 1 further including the step of unitizing said resilient means and said housing.

5. A method of forming a universal flexural assembly having resiliency apertures disposed coincident with perpendicular axes about which universal motion is available, and freedom of motion spaces respectively disposed about and concentric with said apertures comprising the steps of:

provided an integral body with said apertures and freedom of motion chambers therein;

providing resilient members to said resiliency apertures; and removing excess material from said body to transform said freedom of motion chambers into said freedom of motion spaces.

6. The method as claimed in claim 5 wherein the integral body is provided by casting.

7. The method as claimed in claim 5 wherein said freedom of motion chambers are formed by electro-etching.

8. The method as claimed in claim 5 wherein said resiliency apertures are formed by drilling.

9. The method as claimed in claim 5 wherein the excess material is removed by grinding.

* * * * *